United States Patent [19]

Adamson

[11] E Re. 31,089

[45] Reissued Nov. 23, 1982

[54] TRANSDUCER SYSTEM FOR CONTINUOUS MONITORING LIQUID LEVELS IN STORAGE TANKS AND THE LIKE

[75] Inventor: John S. Adamson, La Habra, Calif.

[73] Assignee: Chevron Research Company, San Francisco, Calif.

[21] Appl. No.: 220,626

[22] Filed: Dec. 29, 1980

Related U.S. Patent Documents

Reissue of:

[64] Patent No.: 4,194,177
Issued: Mar. 18, 1980
Appl. No.: 854,917
Filed: Nov. 25, 1977

[51] Int. Cl.[3] ..... H04Q 9/14; G08C 19/16

[52] U.S. Cl. ..... 340/825.55; 340/870.19; 340/870.24; 340/618

[58] Field of Search ..... 340/870.19, 870.24, 340/152 T, 618

[56] References Cited

U.S. PATENT DOCUMENTS

| | | | |
|---|---|---|---|
| 3,462,736 | 8/1969 | Hollands | 340/870.19 |
| 3,742,473 | 6/1973 | Hadden | 340/870.24 |
| 4,030,095 | 6/1977 | Dalmal | 340/618 |
| 4,160,239 | 7/1979 | Adamson | 340/152 T |
| 4,171,520 | 10/1979 | Adamson | 340/152 T |
| 4,203,090 | 5/1980 | Adamson | 340/152 T |

*Primary Examiner*—Donald J. Yusko
*Attorney, Agent, or Firm*—D. A. Newell; Edward J. Keeling; H. D. Messner

[57] ABSTRACT

The liquid level within a storage tank network is continuously monitored by a transducer system of the present invention formed essentially of MSI's (Medium Scale Integrated Chips) including a differential pressure (dp) cell in circuit with a digital volt meter (DVM) which, in turn, is connected to a series of look-up ROM's (Read-Only Memories). In operation and as a function of dp cell output level, DVM is continuously applying BCD signals to the ROM's, such signals being proportional to liquid level. The ROM's retain, in memory, the Gray code translations of the BCD input. The ROM's are then periodically accessed via an analog multiplexer controlled by an oscillator/ripple counter to provide corresponding microcircuit level signals at the output of a 7-segment decoder/driver. Thereafter, the microcircuit signals are regenerated—at levels compatible with conventional MARK-SPACE tank gauging systems—using an isolation/driver network in circuit with the 7-segment decoder/driver. The aforementioned system is initiated by a MARK-SPACE interrogation signal and has special utility in digitally monitoring product-/source levels within source/product storage tank networks associated with an oil refinery and/or a chemical complex.

21 Claims, 11 Drawing Figures

JAMS OSCILLATOR
RESET ON INTERROGATION PULSE
0 1 2 3 4 5 6 7 8 9 10 11 12 13 14 15
80
81
82
83
84
85
ENABLE M/S OUTPUT
MULTIPLEXER ADDRESS 1
2
4
8

TRANSDUCER SYSTEM FOR CONTINUOUS MONITORING LIQUID LEVELS IN STORAGE TANKS AND THE LIKE

Matter enclosed in heavy brackets [ ] appears in the original patent but forms no part of this reissue specification; matter printed in italics indicates the additions made by reissue.

*This application is a reissue of Ser. No. 854,917 filed Nov. 25, 1977, Pat. No. 4,194,177 issued Mar. 18, 1980.*

DISCLAIMER

While the above Abstract has been carefully written, the purpose of such statements is to provide a non-legal description of the contents of the application as a searching, scanning and classification aid for technical persons. Accordingly, all hereinbefore-presented statements are not intended to be used in understanding or otherwise comprehending the principles of the invention to be discribed in detail hereinafter, and are not, more particularly, to be used in interpreting or in any way limiting the scope and fair interpretation of the claims appended hereto.

RELATED APPLICATIONS

Related applications assigned to the assignee of the instant application and incorporated herein by reference, all having a common filing date, include: U.S. Ser. No. 855,033, J. S. Adamson for "Transponder System Including an Oscillator Ripple Counter Controlling A Coded Analog Multiplex Network In A Circuit With a Driver/Gate Circuit For Generating "Red-Alert" End Condition Digital Signals In A Storage Tank Gauging System"; U.S. Ser. No. 855,032, J. S. Adamson for "Transponder System Including An Oscillator/Ripple Counter Controlling A Fixed Gray Code Logic Network In Circuit With A Driver/Gate Circuit For Generating "Red-Alert" End Condition Digital Signals In A Storage Tank Gauging System"; and U.S. Ser. No. 854,916, J. S. Adamson for "Transponder System Including An Oscillator/Ripple Counter Controlling A Fixed Gray Code Logic Network In Circuit With A Decoder/Driver Network For Generating "Red-Alert" End Condition Digital Signals In A Storage Tank Gauging System".

FIELD OF THE INVENTION

This invention relates to transducers for monitoring fluid levels, and more particularly, to a continuously operating fluid level tranducer system formed essentially of MSI's (Medium Scale Integrated Chips) in which a differential pressure (dp) cell in the circuit with a digital encoding network through a DVM (Digital Volt Meter) continuously produces an electrical signal proportional to fluid level within a storage tank or vessel. The digital encoding network is initiated by a MARK-SPACE interrogation signal of a MARK-SPACE digital tank gauging system. The output of the digital encoding network is a Gray code digital translation of the electrical signals from the DVM which indicates fluid level within the storage vessel and the like being monitored. The invention has particular utility in monitoring tank farm networks associated with an oil refinery and/or a chemical complex.

BACKGROUND OF THE INVENTION

In MARK-SPACE digital tank gauging systems for monitoring liquid level, conductor buses directly connect all tank stations with a central control monitoring location. Individual tank stations are in multiplexed circuit connection with the central monitoring location. During operations, line voltage of the conductor buses must be held at rather high levels, say 48 volts, to avoid accidental tripping of the system by natural phenomenon, such as lighting. In order to create a MARK or SPACE on the lines of interest, the transducer system associated therewith must generate a complementary high level signal. However, experience has shown that to generate such signals by solid state circuitry say essentially MSI's (Medium Scale Integrated Chips) where such circuits must be formed with minimum device count, simple control capability and low power requirements, is exceedingly difficult to accomplish. This is especially true if the circuit must also be interfaced with present on-site tank gauging systems.

Moreover, there is a present need for an accurate transducer system for monitoring fluid levels within oil refineries and/or chemical complexes, such need having been brought about, to a large extent, by changes in Federal and State laws. While normal refinery practice seeks to avoid overloading storage tanks, now penalties provided by Federal and State laws are so severe, that highly accurate monitoring systems are mandatory. However, experience shows that such systems are difficult to achieve because the reasons previously mentioned, especially if a separate analog-to-BCD-to-Gray code convertors, are to be used.

SUMMARY OF THE INVENTION

Liquid levels in a storage tank network are continuously monitored by a highly reliable transducer system of the present invention including a differential pressure (dp) cell in circuit with a digital encoding network through a differential volt meter (DVM). In operation and as a function of the dp cell output level, the DVM is continuously applying binary-coded-decimal (BCD) signals to a series of look-up ROM's (Read Only Memories) proportional to liquid level within the storage tank being monitored. The ROM's retain, in-memory, the Gray code translation of the BCD inputs. The ROM's are then periodically accessed (based on a received MARK-SPACE signal), via an analog multiplexer controlled by an oscillator/ripple counter, to provide corresponding microcircuit signals at the output of a 7-segment decoder/driver. These microcircuit level signals are regenerated—levels compatible with conventional tank gauging systems—using an isolator/driver network in circuit with the 7-segment decoder/driver. The isolator/driver network includes switching transistors, conduction of which, bring MARK or SPACE lines tied thereto, down to ground potential and create a pulse code proportional to liquid level for display at the central station. Initially, the interrogation signal of the tank gauging system is fed through a surge and polarity circuit to a voltage divider network connected through a transformer to the DVM. The DVM, in turn, resets the oscillator/ripple counter and starts the oscillator clock to initiate operations. The dp cell is also coupled to the DVM, and comprises a pair of flexible diaphragms usually welded to opposite sides of a rigid steel disk. Mode of operation: a force balance principal is used involving movement of the diaphragms as a function of pressure in the diaphragm-disk region, all elements cooperating to provide a drive current proportional to pressure level at the DMV. Within the DVM, analog-to-digital conversion of the output of the dp cell occurs. The resulting BCD signals of the DVM are, in turn, applied to the ROM's which hold a Gray code translation of the BCD signal in their memory. The ROM's are periodically accessed via the analog multiplexer controlled by the oscillator/ripple counter to provide corresponding microcircuit level signals at the output of the 7-segment decoder/driver, as previously indicated. As the oscillator/counter ripples through a cycle, its output stages are sequentially enabled as follows: the least significant bit ($2^{\circ}$ bit) enables the BLANK-input of the 7-segment decoder/driver at the highest repetition rate of the counter whereby the Gray code in memory within the look-up ROM's (addressed as a function of the occurrence of intermediate bits ($2^1$, $2^2$ . . . $2^N$ bits) from the counter), can be accessed in sequence from the decoder. The resulting Gray code is, of course, at microcircuit signal levels and to regenerate them at levels compatible with conventional tank gauging systems requires the use of the isolation/driver network in circuit between the 7-segment decoder/driver and the MARK-SPACE lines of the tank gauging system, as previously mentioned. The single cycle operation ceases because the most significant bit, i.e., the $2^{N+1}$ bit of the oscillator/counter, is fed back to a RC circuit at the input of the latter which drives a diode in circuit therewith into conduction which jams the oscillator clock.

Of some importance in operations is the isolation of the MARK-SPACE tank gauging system from the transducer system of the present invention through use of magnetic- and light-coupled isolation networks.

DESCRIPTION OF THE DRAWINGS

Further features of the invention will become more apparent upon consideration of the following detailed descriptions of the invention when taken in conjunction with the accompanying drawings, wherein.

EMBODIMENTS OF THE INVENTION

Figure 1:
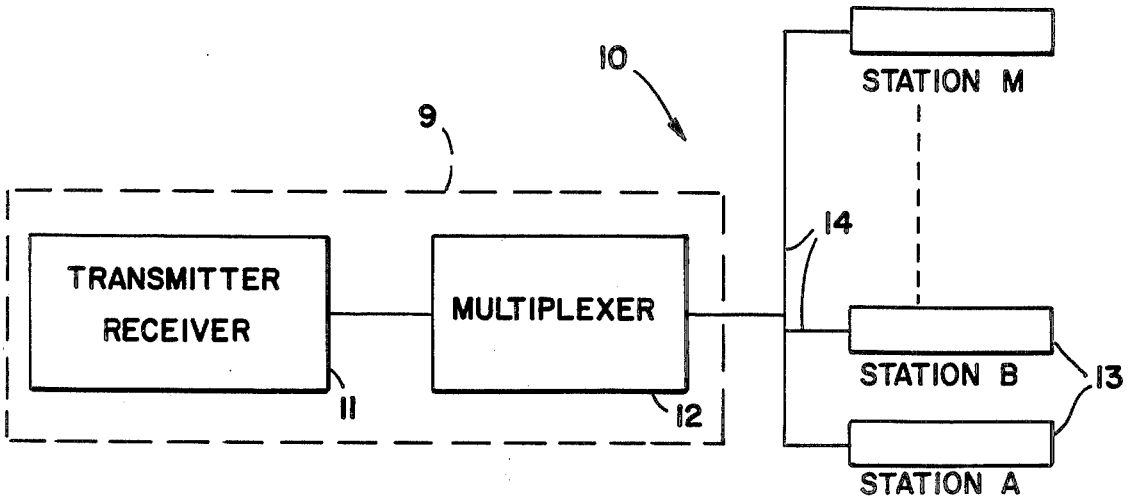
FIG. 1 is a schematic of a tank gauging system servicing—from a central monitoring location—a plurality of field stations, A,B . . . M.

Reference should now be had to FIG. 1 illustrating digital tank gauging system 10 modified in accordance with the present invention.

As shown, system 10 includes a transmitter-receiver 11 and multiplexer 12 located at a central station 9. Receiver-transmitter 11 and multiplexer 12 are in circuit with each other and, in addition with a plurality of field transmitter-receiver networks 13. The latter are located at, i.e., positioned within, a series of tank monitoring stations A,B . . . M and connect to the former through a series of MARK-SPACE conductor buses 14.

Each field transmitter-receiver network 13 at each of the different monitoring station, A,B . . . M, is individually interrogated in sequence by the receiver-transmitter 11 and multiplexer 12 operating at the central station 9. In more detail, the transmitter-receiver 11 and multiplexer 12 interrogate each individual station, A,B . . . M through the emission of a predetermined MARK-SPACE interrogation signal. The last-mentioned signal is usually designed to have a high relative amplitude, say 48 volts d.c., to avoid accidental tripping of the system. It is also uniquely codable vis-a-vis station A,B . . . or M. In response to such signal, a MARK or SPACE bit code, in turn, is generated by the appropriate network 13 proportional to liquid level. Its duration and polarity differs, however, than that of the interrogation signal in that it must pull down the MARK or SPACE line to ground potential and its pulse width is much smaller than that of the interrogation pulse. To generate such signals using MSI's (Medium Scale-Integrated Chips) within each network 13 has been found to be exceedingly difficult in practice to accomplish.

Figure 2:
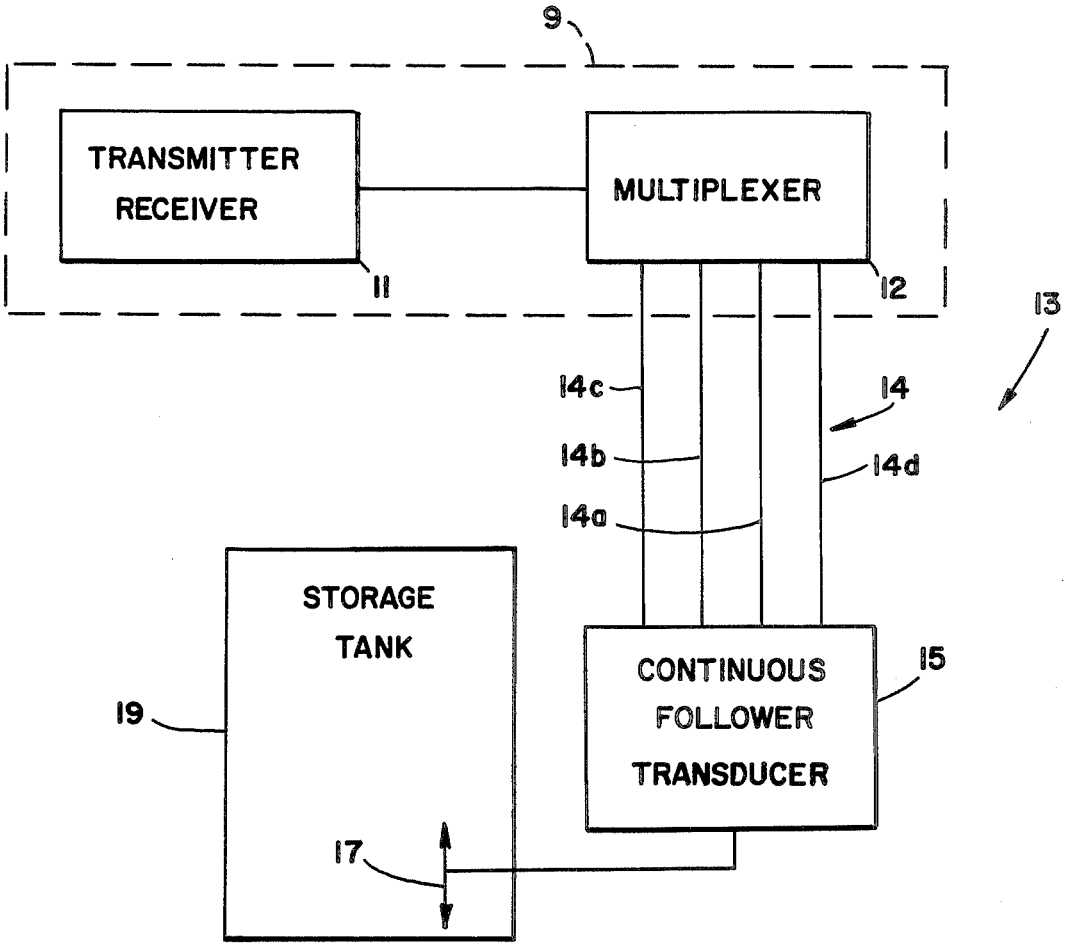
FIG. 2 is a schematic diagram illustrating in some detail a transducer system in the present invention linked—electricaly—to the tank gauging system of FIG. 1.

FIG. 2 shows a field transmitter-receiver network 13 in more detail.

As shown, network 13 includes a continuous follower transducer network (TN) 15 in circuit with pressure-sensitive sensor 17 within storage tank 19. All control and data signals enter and leave TN circuit 15 via elements of the conductor buses 14 previously mentioned to separately control and interact with condition sensor 17.

In operation, the sensor 17 provides pressure signals proportional to liquid level within the tank 19. Such signals are fed, in turn, to TN circuit 15 where it is used to produce, ultimately, a Gray code translation of the liquid level within the tank 19 for display at the central station 9.

Figure 3:
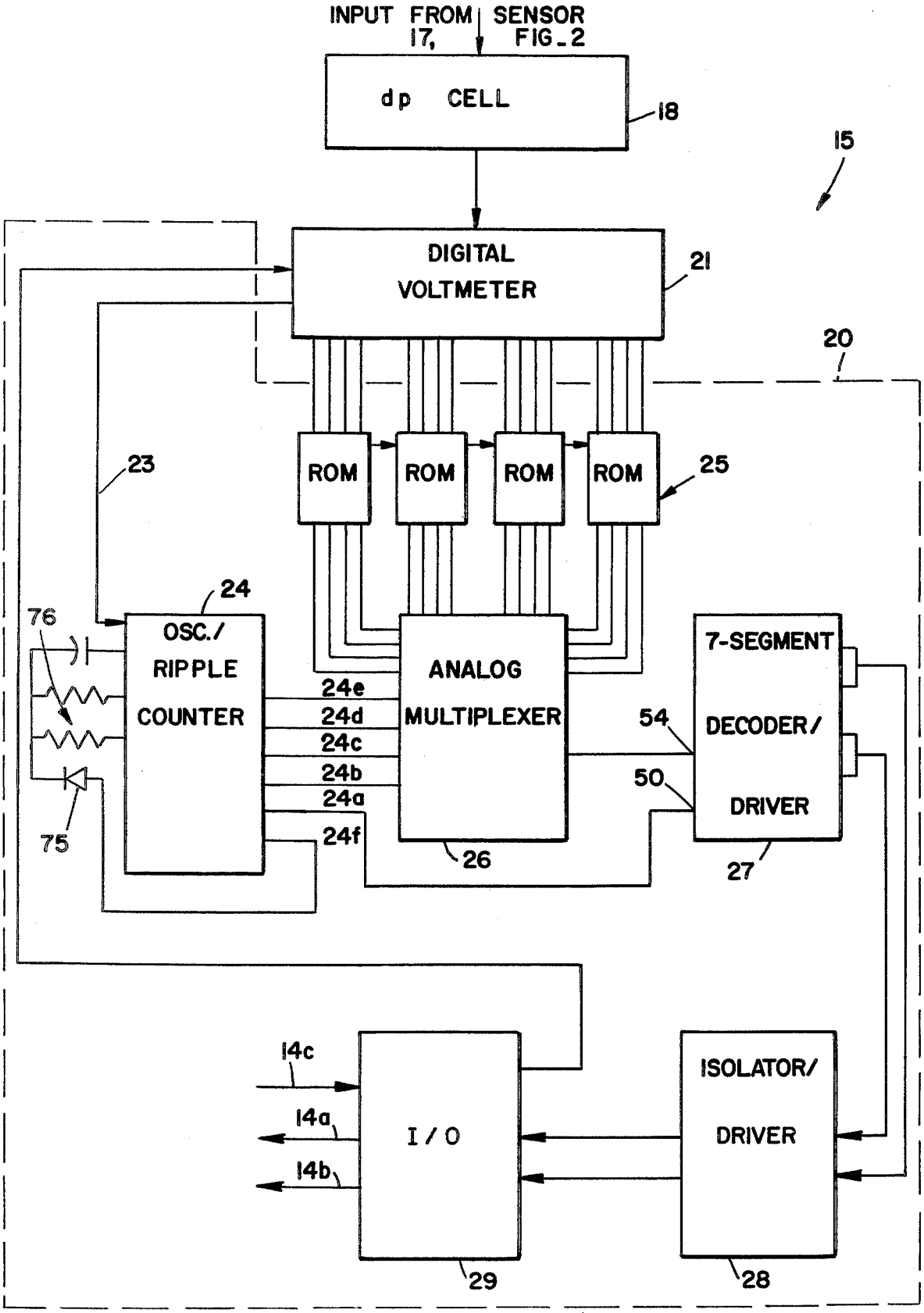
FIG. 3 is yet another schematic diagram illustrating in still more detail the transducer system of FIG. 2.

FIG. 3 illustrates transducer system 15 in more detail.

As shown, system 15 includes a differential pressure (dp) cell 18 in circuit with a digital encoding network 20 through a digital volt meter (DVM) 21. Briefly, the cell 18 first accepts the pressure signals from the sensor 17 within the storage tank 19 of FIG. 2 then converts these signals to analog electrical values. The analog electrical signals are then presented to DVM 21.

The cell 18 is conventional in the art and briefly, can comprise a pair of flexible diaphragms welded to opposite sides of a rigid steel disk. Its mode of operation: a force balance principal is utilized involving movement of the diaphragms as a function of the differential pressure signals proportional to liquid level within the storage tank. The diaphragm and disk combine, in function, to provide an electrical drive current proportional to the differential pressure signals, and hence, also to liquid levels. The resulting analog electrical signals are used to drive DVM 21.

When enabled by a MARK-SPACE interrogation signal, DVM 21 initiates both external and internal operations of the system.

Externally, the DVM 21 provides a power-on reset pulse via enable bus 23 for oscillator/ripple counter 24 of digital encoding network 20 of the present invention. As a result, output stages 24B–24E of the oscillator/-counter 24 are reset to zero and a clock (not shown) therein which paces all operations within the system, is started.

Internally, the DVM 21 performs analog-to-digital conversion of the updated analog data from the dp cell 18 and presents the resulting binary-coded-decimal data (BCD) to a series of look-up Read-Only Memories (ROM's) 25. The ROM's 25 retain, in memory, the Gray code translation of the BCD input. The ROM's 25 are accessed via multiplexer 26 under control of oscillator/ripple counter 14, the data from the ROM's 25 being accessed to 7-segment decoder/driver 27 and thence through isolater/driver network 28 and I/O 29 back to the central station for display.

Cyclic operations of the oscillator/counter 24, ROM's 25, multiplexer 26 and 7-segment decoder/-driver 27 is summarized and set forth in detail in Table I. Note that the ultimate code transmitted is dependent on the particular BCD input to the ROM's 25. Also note that DMV 21 is of conventional design. In this regard, a Weston model 1234 described somewhat in U.S. Pat. No. 3,051,939, has been found to be adequate in this regard.

TABLE I

| Disable $2^{N+1}$ Bit | Data $2^N \ldots 2^2, 2^1$ Bits | Enable $2^0$ Bit | Comment |
|---|---|---|---|
| 0 | 0000 | 0 | Reset & start at Address 0 of multiplexer 26 |
| 0 | 0000 | 1 | Enable Address 0: a SPACE is generated |
| 0 | 0001 | 0 | Set to Address 1 |
| 0 | 0001 | 1 | Enable Address 1 |
| 0 | 0010 | 0 | Set Address 2 |
| 0 | 0010 | 1 | Enable at Address 2 |
| 0 | 0011 | 0 | Set to Address 3 |
| 0 | 0011 | 1 | Enable at Address 3 |
| 0 | 0100 | 0 | Set to Address 4 |
| 0 | 0100 | 1 | Enable at Address 4 |
| 0 | 0101 | 0 | Set to Address 5 |
| 0 | 0101 | 1 | Enable at Address 5 |
| 0 | 0110 | 0 | Set to Address 6 |
| 0 | 0110 | 1 | Enable at Address 6 |
| 0 | 0111 | 0 | Set to Address 7 |
| 0 | 0111 | 1 | Enable at Address 7 |
| 0 | 1000 | 0 | Set to Address 8 |
| 0 | 1000 | 1 | Enable at Address 8 |
| 0 | 1001 | 0 | Set to Address 9 |
| 0 | 1001 | 1 | Enable at Address 9 |
| 0 | 1010 | 0 | Set to Address 10 |
| 0 | 1010 | 1 | Enable at Address 10 |
| 0 | 1011 | 0 | Set to Address 11 |
| 0 | 1011 | 1 | Enable at Address 11 |
| 0 | 1100 | 0 | Set to Address 12 |
| | 1100 | 1 | Enable at Address 12 |
| | 1101 | 0 | Set to Address 13 |
| 0 | 1101 | 1 | Enable at Address 13 |
| 0 | 1110 | 0 | Set to Address 14 |
| 0 | 1110 | 1 | Enable at Address 14 |
| 0 | 1111 | 0 | Set to Address 15 |
| 0 | 1111 | 1 | Enable at Address 15 |
| 1 | 0000 | 0 | Clock jammed; operation cease |

Briefly, in operation, the interrogation voltage pulse is divided and the divided pulse is used to provide (via DVM 21 and enable bus 23) a reset pulse for oscillator/-counter 24. In addition to resetting all output stages 24B–24E of the oscillator/counter 24 to zero, the oscillator clock is also commenced to initiate system operations. As a result, a series of sequential binary "addresses" are generated by the counter 24 which enable, in sequence, the series of ROM's 25 through analog multiplexer 26. The data (HI,LOW's)—at microcircuit input levels—enable through the multiplexer 26 to the 7-segment decoder/driver 27. The fact that the resulting code of interest from the decoder 27 is at microcircuit signal levels, has been previously mentioned, and the former must be increased to a level which is compatible with conventional tank gauging systems. To generate a compatible code, each microcircuit pulse (either a SPACE or MARK) controls switching transistors within isolation/driver network 28 connected to SPACE or the MARK lines 14B or 14A of the conventional tank gauging system attached to I/O 29 to bring the latter down—momentarily—to ground potential. Result: the liquid level digital data can be transmitted back to the central station through the I/O 29 for display and analysis.

Having briefly described operations, above, a more detailed analysis of I/O 29 is in order and is presented below with reference to FIG. 4.

Figure 4:
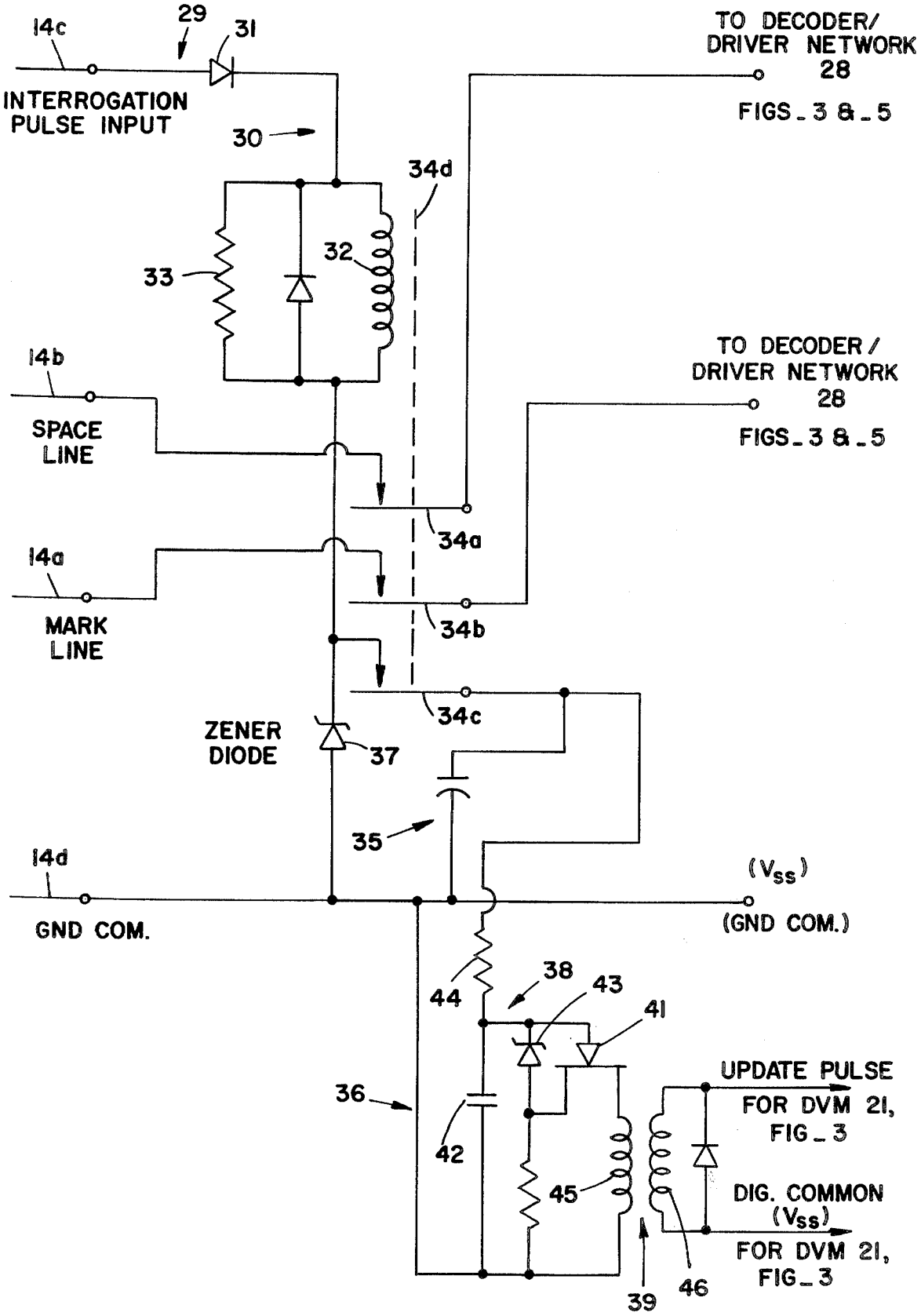
FIGS. 4 and 5 are circuit diagrams of selected circuit elements of the transducer system of FIG. 3.

As shown in FIG. 4, I/O 29 includes a surge and polarity limiting circuit 30 at its input. The circuit 30 comprises a reverse polarity protection diode 31. A relay coil 32 is in circuit with the diode 31 through surge limiting resistor 33. In operation, the diode 31 only conducts when an interrogation signal of the correct polarity as applied to the I/O 29. Note that the interrogation signal energizes the relay coil 32 (closing relay contacts 34A–34C through 34D). Voltage divider 35 is common in the art and reduces the voltage of the interrogation pulse via resistor 33 and Zener diode 37 to a level compatible with microcircuit logic, e.g., say at about 12 volts in the instant application, for use within DVM 21 through power-on reset/isolation network 36 in circuit therewith. With the closing of relay contacts 34B and 34C, note the isolator/driver network 28 is placed in circuit with outside data MARK and SPACE bus lines 14A and 14B, respectively.

Power-on-reset generation can be further explained with reference to the reset-isolation network 36 of FIG. 4.

Reset/isolation circuit 36 includes a pulse forming network 38 in circuit with transformer 39. Briefly, in operation the former generates a reset pulse from the interrogation pulse while the latter isolates the digital encoding network 20 including DVM 21 from the MARK-SPACE system itself.

In more detail, the network 38 includes silicon-controlled rectifier 41 in circuit with a capacitor 42, Zener diode 43 and resistor 44. After the interrogation pulse occurs, rectifier 41 and Zenor diode 43 are enabled, thereafter, causing capacitor 42 to discharge through primary windings 45 of the transformer 39 and generating at secondary windings 46, a reset pulse for DVM 21 in circuit with dp cell 18. Since between the windings 45 and 46 electrical isolation is complete, the effect of different ground potentials are minimized between the MARK-SPACE tank gauging system and DVM 21.

Returning to FIG. 3, recall that data at ROM's 25 is received from DVM 21 as a function of multiple analog signals from dp cell 18. Hence, each ROM 25 has digital significance dependent on its relative position in the data flow. In operation, the data flow is controlled (GAtED) via BLANK-ing input 50 at 7-segment decoder/driver 27 which receives, on an iterative basis, the $2^0$ bit input from oscillator/counter 24.

Figure 5:
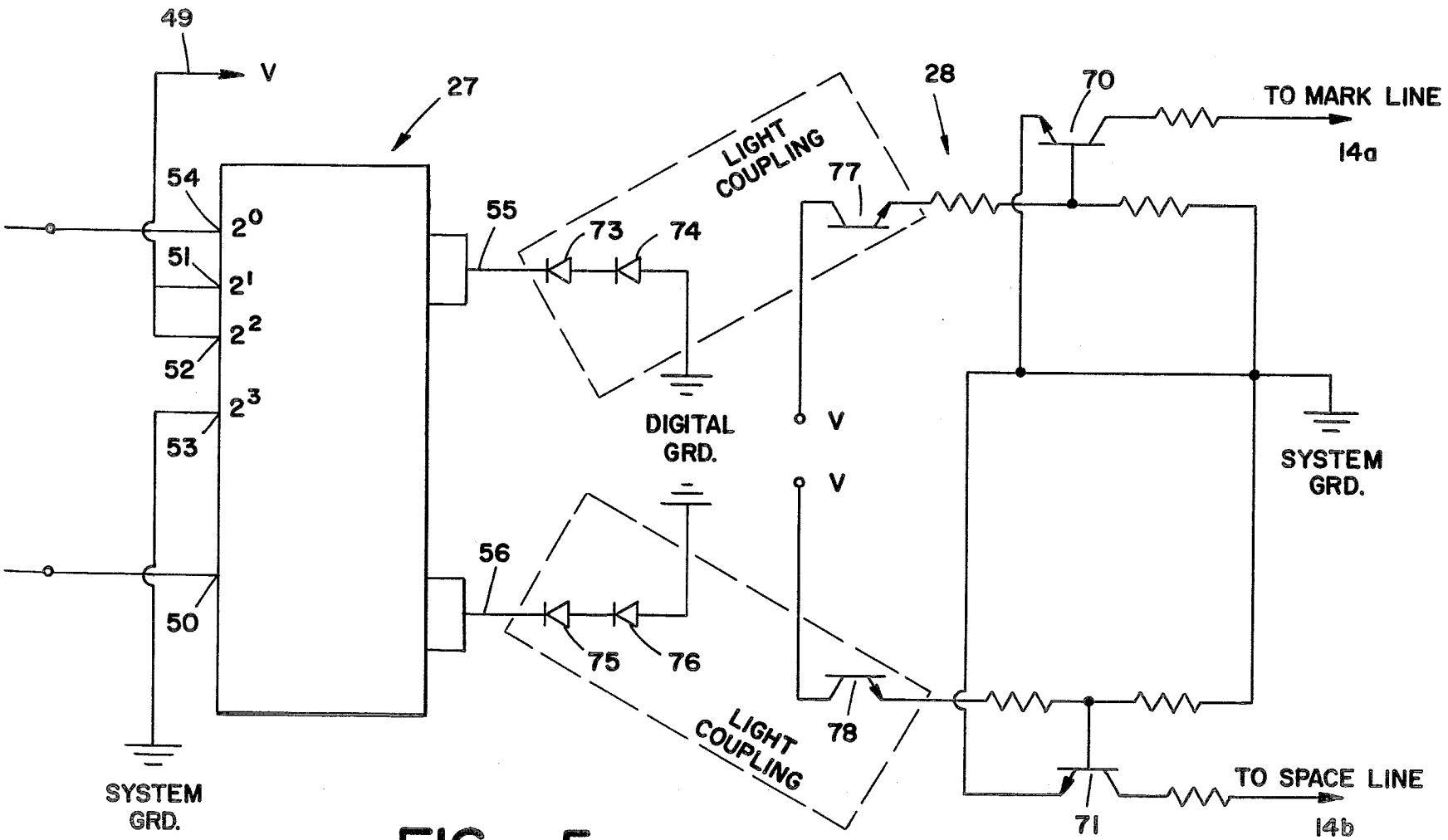

FIG. 5 illustrates data flow within decoder/driver 27 in conjunction with isolator/driver 28, in more detail.

Other inputs of decoder/driver 27 of interest of the present invention includes the $2^1$ bit and $2^2$ bit inputs 51,52 connect to a separate power bus 49; the $2^3$ bit input 53 and the data input 54 connected to ROM's 25 connects to ground. As a result, inputs 51 and 52, i.e., the $2^1$, $2^2$ bit inputs of the 7-segment decoder, are continuously enabled (HI's) while input 53, i.e., the $2^3$ bit input, is a LOW during all operations of the decoder. Outputs 55 and 56 of the decoder/driver connect to switching transistors 70,71, respectively, of isolation/-driver 28 as explained below. As address bit codes (HI's and LOW's) from the ROM's 25 materialize at input 54 of decoder 27, the total operation becomes akin to a 16-addressable ROM. That is to say, the $2^1$ and $2^2$ bit inputs to the decoder are always enabled while the $2^3$ input is LOW so that the decoder oscillates between the binary equivalents of an imaginary LED display of the number "6" and "7" at its outputs 56 or 55, depending on the bit state at input 54, this condition, of course, being synchronized by proper gate bits (HI's) at input 50. E.g., if the input 54 is HI, a "seven" is generated at output 55; while if it is LOW, a "six" is generated at output 56. At the above outputs, the resulting drive currents of the decoder is associative, with two non-overlapping segments of the normal 7-segment LED display being summable (with generation of the number "7") to cause the MARK line transistor 70 to conduct and pull the MARK line 14A down to ground potential, while drive currents associated with two other non-overlapping segments (for generation of the number "six") cause the SPACE line transistor 71 to conduct and pull, likewise, the SPACE line 14B down to ground potential.

Table II below indicates the nature of the 2-in-7 drive current generation by decoder/driver 27.

TABLE II

| 7-Segment LED Configuration | Total Segments Available To Be Driven | Segments Used To Drive MARK Transistor 70 | Segments Used To Drive SPACE Transistor 71 |
|---|---|---|---|
| a | 7, i.e., | 2, i.e., | 2, i.e., |
| f b | a, b, c, d, e, f and g | a, b | e f |
| g | | | |
| c c | | | |
| d | | | |

In a usual LED display of the number "6" (normally occurring with a LOW at input 54, and HI's at inputs 51,52) the following segments would be enabled: f, e, d, c and g. And for display of the number "7" (occurring normally with HI's at inputs 54,51 and 52) the following segments would be enabled: a, b, c. Hence, non-overlapping segments are a,b (when the number "7" is generated) and e, f, d, g, (when the number "6" is generated). In order to equalize current outputs from the non-overlapping segments, only segments d,e were placed in circuit with SPACE transistor 71, however.

But switching transistors 70,71 are not directly connected to outputs 55,56 but use light-coupled interconnection via LED's (light enabling diodes) 73, 74, 75 and 76 in circuit with switching transistors 70,71 through light sensitive transistors 77 and 78. I.e to say, at outputs 55,56 the decoder is further modified so that the resulting drive currents from the decoder are light-coupled via LED's 73–76 through light-sensitive transistors 77 and 78 to switching transistors 70,71.

Note that the signal level at light-sensitive transistors 77,78 is at microcircuit levels but that switching transistors 70,71 provide sufficient drive levels to bring down MARK and SPACE lines 14A to ground potential.

Return to FIG. 3 to review the operational aspects of the transponder system 16 of the present invention.

Note initially the effect of reset pulse of the DVM 21 on operations of the oscillator/ripple counter 24. Not only are all output stages of the counter set to zero by such pulse, but also the latter initiates operation of the oscillator clock. As the counter 24 ripples through a single cycle, individual output stages are activated the controllably enable 7-segment decoder/driver 27 and Iso-driver 28. The result: Gray-code translations (within ROM's 25) of the BCD data from DVM 21 are fed back via I/O 29 to the central station for display and analysis.

E.g., the least significant bit, say the $2^0$ bit of the oscillator/counter 24, can be utilized to selectively enable BLANK-ing input 50 of the decoder/driver 27 while intermediate bits $2^1, 2^2 \ldots 2^N$ bits connect to input 54 of the same decoder. These intermediate bits, i.e., the $2^1, 2^2 \ldots 2^N$ bit code at input 54 are in sequential binary combinations which enable—also in sequence—address inputs of the multiplexer 26 to the ROM's 25. As a result, the state (HI or LOW's) of the ROM's 25 are sampled, and the Gray code equivalent of the analog liquid level data from the dp cell is provided at the 7-segment decoder/driver 27. Thereafter, the SPACE-MARK lines are modulated akin to a $16 \times 1$ ROM in which a X-in-16 particular address enables the MARK line while Y-in-16 address enable the SPACE line to provide Gray code translation of the liquid level of interest.

The most significant bit of the oscillator counter 24 say the $2\ N+1$ is last fed via bus 24F back to the diode 75 at the input to the oscillator/counter 24 (i.e., to RC circuit 76). In operation, conduction of the diode 75 "jams" the oscillator clock of the latter. All output stages of the counter are then placed in an inhibited state. All operations cease.

The synthetic Gray code generation can be further explained with reference to the timing chart of FIG. 6.

Figures 6A, 6B, 6C, 6D, 6E, 6F:
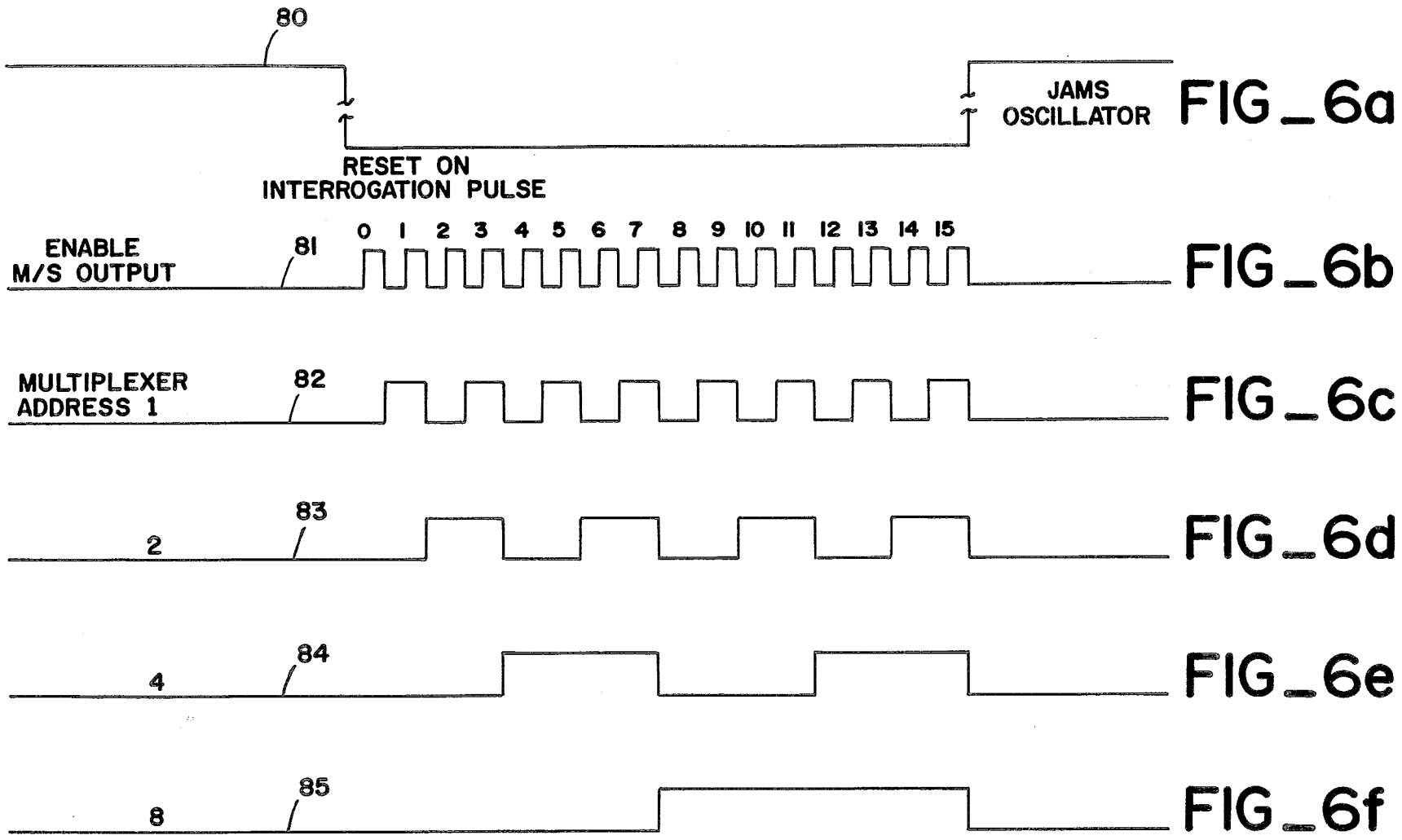
FIGS. 6a–f are timing charts of sets of square wave pulses generated by the circuit of FIG. 3.

As shown, the pulse width of interrogation signal 80 of FIG. 6A is such that usually a certain total of MARK and SPACE pulses, say sixteen, can be provided per interrogation cycle. Hence, the number and pulse width of the enable ($2^0$ bit) pulses of the pulse code 81 of FIG. 6B for the multiplexer 26 would correspond in kind to the MARK and SPACE pulses ultimately generated and displayed. I.e., the square wave enabling ($2^0$) code 81 would have a repetition rate and pulse width matchable in kind to the MARK and SPACE pulses generated by the switching transistors 70,71. This is not true for the address command codes 82, 83, 84 and 85, of FIGS. 6C–6F. Each is initiated by the falling edge of the initial pulse of the preceeding set of square wave address pulses and has a progressively increasing pulse width and correspondingly a progressively decreasing repetition rate. Note all codes 81–85 as well as the disabling bit terminate with the trailing edge of the interrogation pulse 80 of FIG. 6A.

From the above, it is apparent that the invention as hereinbefore described has variations readily apparent to those skilled in the art and hence the invention is not limited to the combination of embodiments hereinbefore described but should be given the broadest possible interpretation in the terms of the following claims.

What is claimed is:

1. Transducer system for generating a digital code indicative of liquid level within a storage tank or the like, upon receipt of a square wave interrogation signal from a transmitter/receiver of a tank gauging system located at a central station remote from said storage tank but electrically connected to said transducer system through an INTERROGATION, a MARK and a SPACE line of said tank gauging system, comprising:

(a) means for providing a series of input signals representative of liquid level within said tank, said means including a digital volt meter (DVM) in circuit with a series of look-up read-only-memories (ROM's);

(B) I/O network for receiving said interrogation signal and connected to said DVM for generating a reset signal therefrom in response to said interrogation signal;

(C) an oscillator/ripple counter formed essentially of MSI's connected to said DVM and including at an input, a network for receiving said reset pulse from said DVM, said oscillator/ripple counter generating, in response to said reset pulse, sets of square wave pulses of differing repetition rates and pulse widths;

(D) a multiplexer and multi-segment decoder/driver means connected to each other and to (B) responding to selected sets of said square wave pulses to generate a synthetic digital code indicative of liquid level at microcircuit signal levels at an output means of said decoder/driver means;

(E) isolatordriver means having one or more inputs connected to said decoderdriver means of (D, and one or more output means connected to said MARK and SPACE lines controllable as a function of said synthetic digital code to drive said MARK and SPACE lines between tank gauging operating potentials for generating said digital code of interest at said central station whereby said liquid level condition within said storage tank can be indicated.

2. The transducer system of claim 1 in which an initial first generated set of square wave pulses by (C) is characterized by a repetition rate higher than those of subsequent sets of square wave pulses, for enabling an input of said multi-segment decoder/driver means of (D) at said same repetition rate, and generating said synthetic digital code at microcircuit signal levels.

3. Transducer system of claim 2 in which said enabled input of said decoder/driver means of (D) is the BLANK-ing input of a 7-segment decoder/driver.

4. The transducer system of claim 2 in which each subsequent set of generated sets of square wave pulses provide in combination a series of address commands at input means of said decoder/driver means of (D) whereby X-in-16 particular address command per interrogation cycle enables said decoder/driver means in circuit with MARK line through said switching transistor means, and Y-in-16 address commands per cycle enable said SPACE line where X and Y are whole numbers and $X+Y=16$, and whereby said synthetic code indicative of liquid level is generated.

5. Transducer system of claim 4 in which said input means of said decoder/driver means of (D) is the 2° bit input of a 7-segment decoder/driver.

6. The transponder network of claim 4 in which each subsequent set of generated sets of square wave pulses provide in combination a series of multi-bit address commands for said multiplexer means of (D) whereby output lines thereof are placed in alternately circuit with said ROM's to receive synthetic code of interest.

7. Transponder system of claim 6 in which said logic output lines connect to a 2° bit data input of a 7-segment decoder/driver.

8. Transponder system of claim 7 in which $2^1$ and $2^2$ bit inputs of said 7-segment decoder/driver are continuously HI, and the $2^3$ bit input is continuously LOW whereby first and second outputs of said 7-segment decoder/driver oscillates between binary equivalents of a imaginary LED display of the number "6" or "7", depending on HI,LOW state of said 2° bit input thereof.

9. Method of generating a digital code indicative of liquid level within a storage tank or the like upon receipt of a square wave interrogation signal from a transmitter receiver of a tank gauging system located at a central station remote from said storage tak under survey but electrically connected to said transponder network through an INTERROGATION, a MARK and a SPACE line of said tank gauging system, comprising the steps of:

(A) encoding, as a updated, stored digital code, a series of input signals representative of liquid level within said storage tank in response to said interrogation signal;

(B) generating a microcircuit rest signal after said encoded digital code has been generated and stored at a series of memory addresses;

(C) generating in response to said reset pulse, sets of square wave pulses of differing repetition rates and pulse widths;

(D) in response to selected sets of said square wave pulses of (C) logically scanning said series of memory addresses and forming a synthetic digital code at microcircuit signal levels directly equivalent to said encoded digital code of (A); and (E) as a function of said synthetic digital code, driving said MARK and SPACE lines to generate a MARK-SPACE digital code at said central station equivalent—in detail—to said encoded digital code of (A) whereby said liquid level condition within said storage tank can be indicated.

10. Method of claim 9 in which said each subsequent generated set of square wave pulses of (C) is initiated in coincidence with a trailing edge of an initially generated pulse of said succeeding set of pulses, but all sets terinate in coincidence with termination of said interrogation signal.

11. Method of claim 9 in which an initial first generated set of square wave pulses of (C) is characterized by a repetition rate higher than those of subsequent sets of square wave pulses for scanninng—in sequence—said memory address contaning said encoded digital code of (A) from which said synthetic digital code at microcircuit signal levels can be generated.

12. Method of claim 11 in which each of said memory addresses is designated address 1, address 2, address 3 . . . or address N.

13. Method of claim 12 with the additional substep of (C) being lastly generated a $N+1$ address pulse terminating all operations.

*14. Transducer system for generating a digital code indicative of liquid level within a storage tank or the like, upon receipt of a square wave interrogation signal from a transmitter/receiver of a tank gauging system located at a central station remote from said storage tank but electrically connected to said transducer system through an IN-*

*TERROGATION, a MARK and a SPACE line of said tank gauging system comprising:*

*(A) means for providing a series of input signals representative of liquid level within said tank, said means being in circuit with a series of look-up read-only-memories (ROM's);*

*(B) I/O network for receiving said interrogation signal and connected to (A) for generating a reset signal therefrom in response to said interrogation signal;*

*(C) an oscillator/ripple counter formed essentially of MSI's connected to (A) and including at an input a network for receiving said reset pulse from (A), said oscillator/ripple counter generating, in response to said reset pulse, sets of square wave pulses of differing repetition rates and pulse widths;*

*(D) a multiplexer and multi-segment decoder/driver means connected to each other and to (B) responding to selected sets of said square wave pulses to generate a synthetic digital code indicative of liquid level at microcircuit signal levels at an output means of said decoder/driver means;*

*(E) isolator/driver means having one or more inputs connected to said decoder/driver means of (D), and one or more output means connected to said MARK and SPACE lines controllable as a function of said synthetic digital code to drive said MARK and SPACE lines between tank gauging operating potentials for generating said digital code of interest at said central station whereby said liquid level condition within said storage tank can be indicated.*

*15. The transducer system of claim 14 in which an initial first generated set of square wave pulses by (C) is characterized by a repetition rate higher than those of subsequent sets of square wave pulses, for enabling an input of said multi-segment decoder/driver means of (D) at said same repetition rate, and generating said synthetic digital code at microcircuit signal levels.*

*16. Transducer systems of claim 15 in which said enabled input of said decoder/driver means of (D) is the BLANK-ing input of a 7-segment decoder/driver.*

*17. The transducer system of claim 15 in which each subsequent set of generated sets of square wave pulses provide in combination a series of address commands at input means of said decoder/driver means of (D) whereby X-in-16 particular address command per interrogation cycle enables said decoder/driver means in circuit with said MARK line through said switching transistor means, and Y-in-16 address commands per cycle enable said SPACE line where X and Y are whole numbers and $X+Y=16$, and whereby said synthetic code indicative of liquid level is generated.*

*18. Transponder system of claim 17 in which said input means of said decoder/driver means of (D) is the $2^0$ bit input of a 7-segment decoder/driver.*

*19. The transponder network of claim 17 in which each subsequent set of generated sets of square wave pulses provide in combination a series of multi-bit address commands for said multiplexer means of (D) whereby output lines thereof are placed in alternate circuit with said ROM's to receive said synthetic code of interest.*

*20. Transponder system of claim 19 in which said logic output lines connect to a $2^0$ bit data input of a 7-segment decoder/driver.*

*21. Transponder system of claim 20 in which $2^1$ and $2^2$ bit inputs of said 7-segment decoder/driver are continuously HI, and the $2^3$ bit input is continuously LOW whereby first and second outputs of said 7-segment decoder/driver oscillates between binary equivalents of an imaginary LED display of the number "6" or "7", depending on HI, LOW state of said $2^0$ bit input thereof.*

* * * * *